(12) United States Patent
Klunder et al.

(10) Patent No.: US 9,218,270 B2
(45) Date of Patent: Dec. 22, 2015

(54) FUNCTIONAL SOFTWARE TESTING FRAMEWORK FOR DETERMINATE LEVEL TESTING

(71) Applicant: Digital River, Inc., Minnetonka, MN (US)

(72) Inventors: Mark Thomas Klunder, Chanhassen, MN (US); Oleg Yeshaya Ryaboy, Hopkins, MN (US)

(73) Assignee: Digital River, Inc., Minnetonka, MN (US)

( * ) Notice: Subject to any disclaimer, the term of this patent is extended or adjusted under 35 U.S.C. 154(b) by 17 days.

(21) Appl. No.: 14/215,957

(22) Filed: Mar. 17, 2014

(65) Prior Publication Data

US 2014/0317600 A1    Oct. 23, 2014

Related U.S. Application Data

(60) Provisional application No. 61/793,423, filed on Mar. 15, 2013.

(51) Int. Cl.
*G06F 11/36* (2006.01)

(52) U.S. Cl.
CPC .................. *G06F 11/3672* (2013.01)

(58) Field of Classification Search
CPC ................. G06F 11/3672; G06F 8/00
USPC ............................................ 717/124
See application file for complete search history.

(56) References Cited

U.S. PATENT DOCUMENTS

| | | | |
|---|---|---|---|
| 7,694,181 B2 * | 4/2010 | Noller et al. | 714/38.11 |
| 2011/0225567 A1 * | 9/2011 | Livny et al. | 717/125 |
| 2011/0258601 A1 * | 10/2011 | Ndem et al. | 717/124 |
| 2012/0278900 A1 * | 11/2012 | Sebald | 726/28 |
| 2014/0282410 A1 * | 9/2014 | Chan et al. | 717/124 |

* cited by examiner

*Primary Examiner* — John Chavis
(74) *Attorney, Agent, or Firm* — Michael A. Collins; Lynn Marie Holly

(57) ABSTRACT

A method and system of testing coded features is provided that provides deterministic test results. The method includes building an instance of the hosted application using a minimum set of information required for the instance of the hosted application. A coded feature to be tested is deployed to the created instance of the hosted application and tests are run against the deployed coded feature.

18 Claims, 3 Drawing Sheets

FUNCTIONAL SOFTWARE TESTING FRAMEWORK FOR DETERMINATE LEVEL TESTING

CROSS-REFERENCE TO RELATED APPLICATION

This application claims the benefit of U.S. Provisional Application No. 61/793,423, filed on 15 Mar. 2013, the contents of which are incorporated herein by reference. A claim of priority is made.

TECHNICAL FIELD

This disclosure relates to software testing and deployment, and more particularly to techniques for providing a functional test framework that provides deterministic results.

BACKGROUND

Software applications that reside on a server and are accessed by a client through a network are generally referred to as hosted applications, and may also be referred to as Internet-based applications, web-based applications, or online applications. Examples of hosted applications include ecommerce websites and web-based email applications. Before additional features are deployed as part of an existing hosted application, the additional features may be tested to identify possible bugs. Typically, additional features are tested by the developer during the development stage using unit testing and by the quality assurance personnel after the development stage using functional testing. Unit testing is a test that determines whether a coded feature works properly in isolation. For example, unit testing may indicate to a developer whether a coded tax function calculates tax correctly. However, unit testing may not indicate whether a coded feature will work correctly once deployed in an environment (e.g., will the calculated tax be displayed properly in a clients application) or whether the deployed coded feature will cause other errors to occur in an environment.

Functional testing attempts to determine whether an additional coded function, once deployed, will cause errors anywhere in an environment system. Typically functional testing is time consuming and performed after the development cycle by the quality assessment personnel other than the developer. Thus, a developer must wait until receiving a report from quality assurance to correct aspects of a coded feature, which in turn lengthens the overall development cycle.

SUMMARY

A functional software testing framework for providing deterministic testing is provided. In an exemplary embodiment, the method of providing deterministic testing includes building an instance of the hosted application using a minimum set of information required for the instance of the hosted application. A coded feature to be tested is deployed to the created instance of the hosted application and tests are run against the deployed coded feature.

In an exemplary embodiment, a system for providing deterministic testing includes a workstation coupled to a communications network that allows a developer to code features to be tested. A dedicated application is coupled to the workstation via a communication network and is configured to host an instance of the hosted application and the coded feature to be tested. In addition, the workstation provides meta data to the dedicated application stack that describes or represents a minimum set of information required for operation of the hosted application. A replication system is also coupled to the workstation via the communication network, wherein the workstation provides functional tests for the replication system to perform on the deployed coded feature.

The details of one or more examples are set forth in the accompanying drawings and the description below. Other features, objects, and advantages will be apparent from the description and drawings, and from the claims.

DETAILED DESCRIPTION

In general, this disclosure describes techniques for testing a feature to be deployed as part of a hosted application, and in particular describes techniques for efficient, determinate level testing during the development stage.

Figure 1:
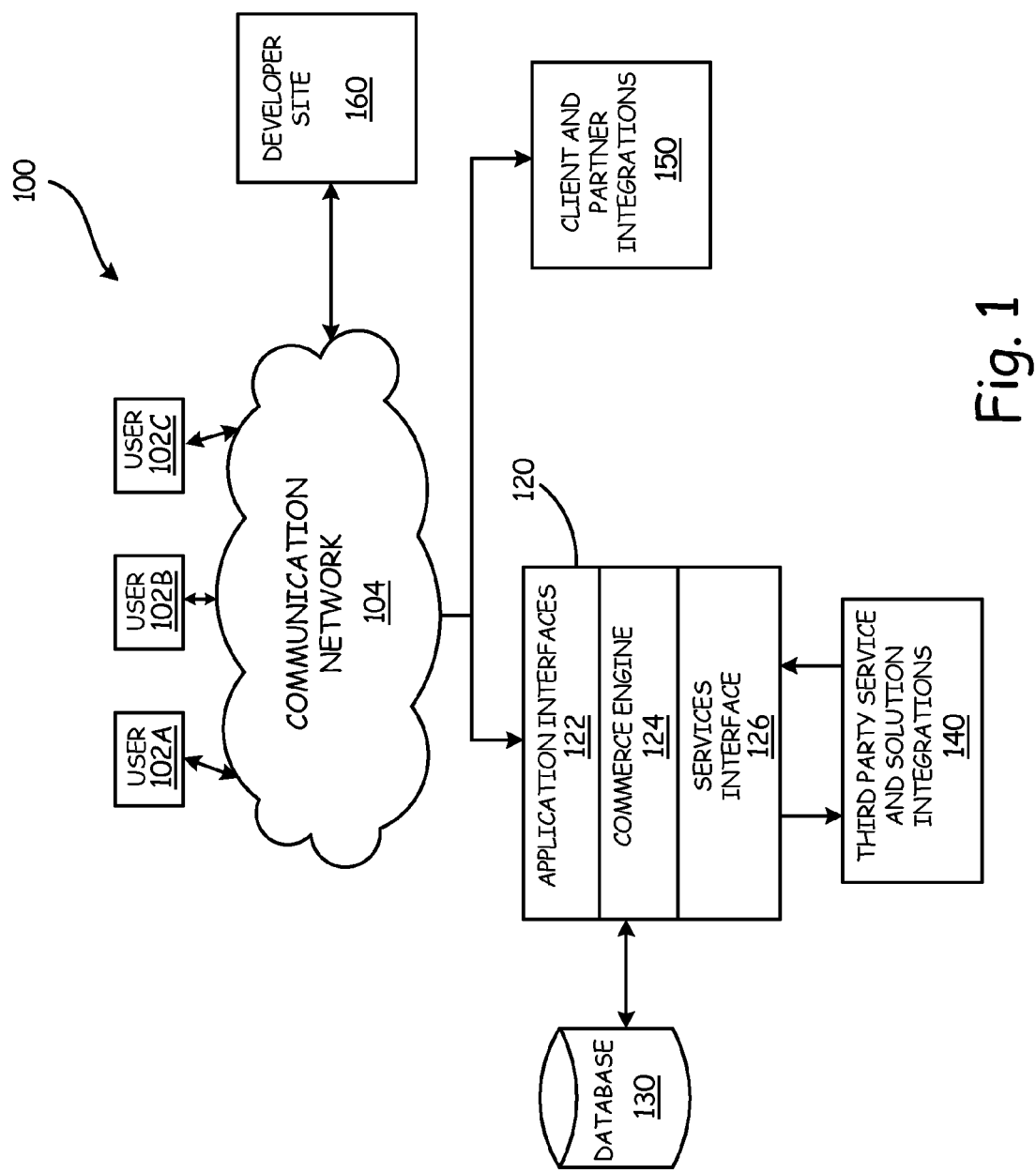
FIG. 1 is a block diagram of a system for hosting a web based application according to an embodiment of the present invention.

FIG. 1 is a block diagram illustrating a system for hosting a web based application according to an embodiment of the present invention. In the example of FIG. 1, the hosted web based application is illustrated as an ecommerce system 100. Ecommerce systems may include ecommerce services and applications that are hosted on servers. These services may be accessed by networked users on a remote computing device through a web browser. It should be noted that the techniques described herein are generally applicable to any type of hosted application, such as, for example, email, maps, online gaming, banking, etc. User devices 102A-102C may access an ecommerce server 120 through a communication network 104. User devices 102A-102C may include any device configured to transmit and receive data from communication network 104. For example, communication devices may be equipped for wired and/or wireless communications and may include desktop or laptop computers, mobile devices, smartphones, cellular telephones, set top boxes, and personal gaming devices. Communications network 104 may comprise any combination of wireless or wired communication medium. Communication network 104 may form part of a packet-based network, such as a local area network, a wide-area network, or a global network such as the Internet. Communication network 104 may include routers, switches, base stations, or any other equipment that may be useful to facilitate communication from user devices to ecommerce server 120.

Ecommerce server 120 is a host server that includes software modules that allows user devices to 102A-102C to access applications. Software modules may be stored in a memory and executed by a processor. Ecommerce server 120 may include one or more processors and memory devices. When the techniques are implemented partially in software, a device may store instructions for the software in a suitable, non-transitory computer-readable medium and execute the instructions in hardware using one or more processors to perform the techniques of this disclosure. Further, it should be noted that ecommerce server 120 may include a plurality of servers, each of which may include a plurality of processors and a plurality of internal and/or external memory devices. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media.

In the example illustrated in FIG. 1, ecommerce server 120 includes application interface 122, commerce engine 124, and services interface 126. Application interface 122, commerce engine 124, and services interface 126 may be implemented as any of a variety of suitable circuitry, such as one or more microprocessors, digital signal processors (DSPs), application specific integrated circuits (ASICs), field programmable gate arrays (FPGAs), discrete logic, software, software modules, hardware, firmware or any combinations thereof. Application interface 122 may include tools that are presented to a user for use in implementing and administering online stores and their functions, including, but not limited to, store building and set up, merchandising and product catalog (user is a store administrator or online merchant), or for purchasing items from an online store (user is a shopper). Commerce engine 124 may include a number of components required for online shopping, for example, modules with instructions stored in memory that when executed by the processor perform functions related to customer accounts, orders, catalog, merchandizing, subscriptions, tax, payments, fraud, administration and reporting, credit processing, inventory and fulfillment. Service interface 126 may allow support services to interface with commerce engine 124. Support services may include, for example, marketing, analytics, fraud, payments, and enterprise foundation services (social stream, wishlist, saved cart, entity, security, throttle and more). Services interface 126 may be configured to allow third party services and solutions 140 and client and partner integrations 150 to be integrated into the ecommerce system. Third party services and solutions 140 may be contracted with to provide specific services, such as address validation, payment providers, tax and financials. Client integrations may be comprised of client external systems (customer relationship management, financials, etc), sales feeds and reports and catalog and product feeds. Partner integrations may include fulfillment partners, client fulfillment systems, and warehouse and logistics providers.

In the example illustrated in FIG. 1 a developer site 160 may also be included in ecommerce system 100. Developer site 160 may be configured to maintain, update, improve, and monitor applications and functions that are being hosted by ecommerce server 120. For example, developer site 160 may provide updates to a home page of an ecommerce website based on the popularity of particular products. Developer site 160 may be part of an organization providing ecommerce service or an independent organization that provide development services.

Figure 2:
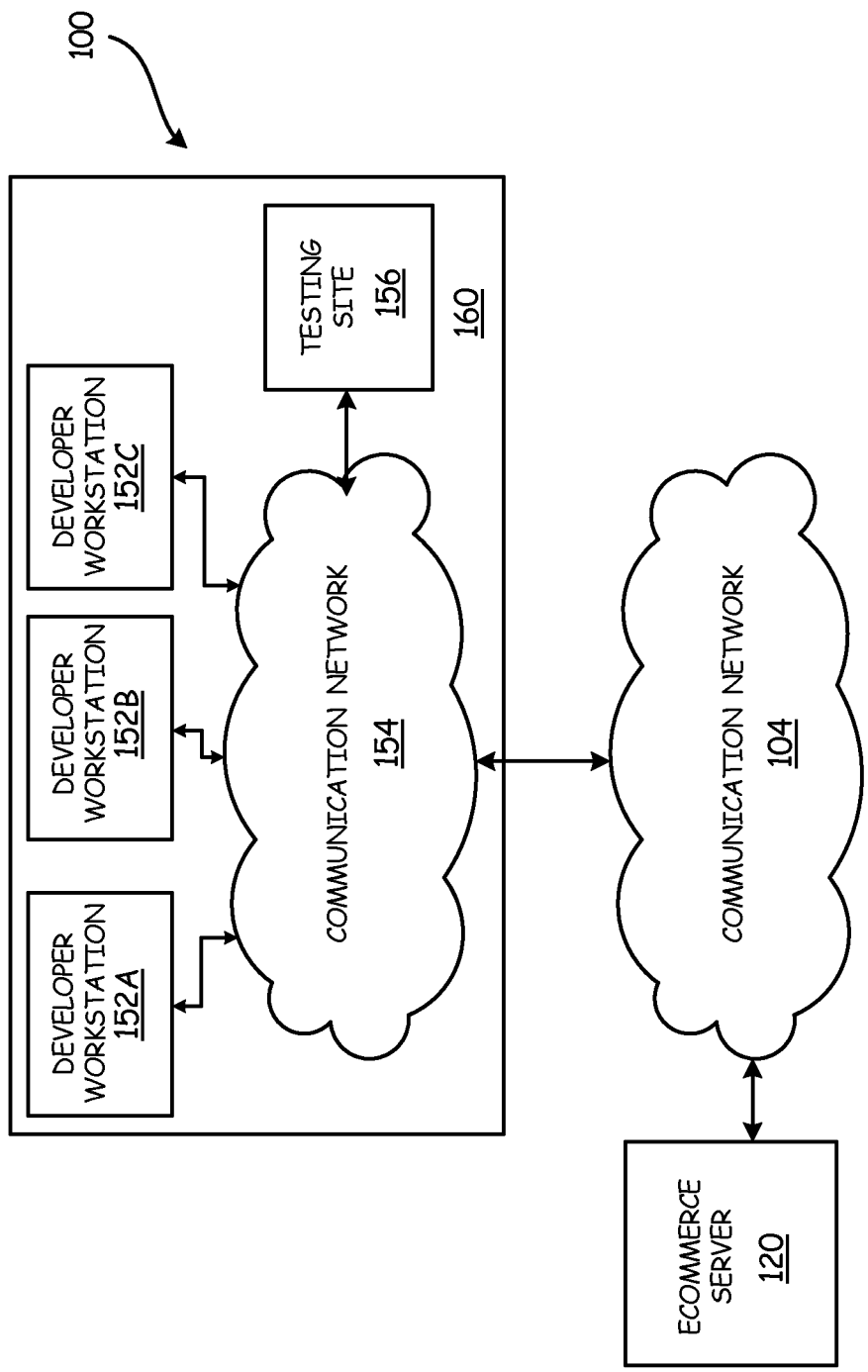
FIG. 2 is a block diagram of a development site for developing and testing a hosted application according to an embodiment of the present invention.

FIG. 2 is a block diagram illustrating an example developer site. Developer site 160 includes one or more developer workstations 152A-152C. Developer workstations 152A-152C may include any device such as, a laptop or a desktop computer cable of coding software functions. Developer workstations 152A-152C may include computers running an operation system, such as, for example, Linux, and/or operation systems developed by Microsoft or Apple. Developer workstations 152A-152C may include a combination of hardware and software that enables developers to code software according to a specified programming language. In one example, developer workstations 152A-152C may be configured to allow developers to code web-based features using a programming language, such as, for example, Java. In one example code of web-based features may include JARS, snapshots and site configurations. Development site 160 includes communication network 154. Communication network 154 is configured to allow developer workstations 152A-154C and testing site 156 to communication with one another. Communications network 154 include any combination of components describe with respect to communication network 104. However, communication network 154 may include additional security protocols, such as firewalls, such that ecommerce applications cannot be modified or accessed by unauthorized personnel.

As described above, when an additional feature is developed, the functionality of the feature may be tested by a developer during the development stage using unit testing. Thus, each of developer workstations 152A-154C may be configured to perform unit testing. Further as described above, additional developed functionality may be tested using functional testing. In the example illustrated in FIG. 2, testing site 156 is a site where functional testing occurs. Testing site 156 may be distinct from the developer workstations 152A-154C. As described in more detail below, it is desirable for testing site to provide results that are deterministic—that is, the same input will always provide the same output. In addition, the results should be timely and accessible to the developers.

To provide a testing site that deterministic, testing site 156 is configured to allow each developer to maintain his/her own instance of the hosted application. That is, no other developers are allowed to access or interact with the hosted application instance of another developer—sometimes referred to as a "share nothing" system. To minimize the impact of duplicating the hosted application a plurality of times for each developer, developer workstations include tools that allow the developer to create an instance of the hosted application with a minimal amount of information. For example, depending on the feature being tested, not all aspects of the database associated with the hosted application are required to run the hosted application. By selecting a minimum set of required data to run on testing site 156, each developer is able to maintain his/her own instance of the hosted application.

In addition to maintaining individual instances of the hosted application, testing site 156 is made deterministic by ensuring that the hosted application does not rely on $3^{rd}$ party services. As discussed in more detail with respect to FIG. 3, testing site 156 utilizes a mock services module to emulate services provided by $3^{rd}$ party providers. For example, an e-commerce site that relies on a payment verification system implemented by a third party. However, in a testing environment, errors caused by the payment verification system will result in errors being generated by the test scripts, but without a clear indication of what caused the error. In this way, the system is not deterministic because the same input may provide a different output based on the operation of the $3^{rd}$ party system. The mock services module cures this deficiency by emulating the responses provided by the $3^{rd}$ party providers, but in a way that is controlled and designed by the developer. With these tools, the developer creates a functional test environment by deploying an instance of the hosted application to testing site 156.

Having deployed a developer's instance of the hosted application to testing site 156, the developer is responsible for writing the code for the feature to be tested and the tests to be run on the coded feature. In one example, developer workstation 352 may be configured such that a developer can write a functional test corresponding to a coded feature using the same programming language as the coded feature. In this way, functional tests remain accessible to each developer. For example, a coded feature and a functional test may both be written using the Java programming language. In this manner, a test may be written using a plug-in or API, such as, for example, the Selenium WebDriver API that will run the test against the hosted application. Further a test may have a test structure multi-page structure such that (1) Each Page is a separate object that isolates the developer from the complexity of the selenium interface and x-path, (2) Pages are aggregations of components, and (3) a component represents a piece of functionality on a page.

Having deployed the coded feature and the functional test, the functional test code is run on testing site 156 and results are returned to the developer via the developer workstation. In addition to the functional test environment being accessible and deterministic, the functional test environment also runs automatically and provides results in a timely fashion. This is contrast with prior art systems, in which testers manually interact with the hosted application and then interpret the results. Because prior art systems are not determinate, an inordinate amount of time is spent not only manually running the tests, but also in interpreting results of the functional test. The present invention—as both automatic and deterministic—is able to test a plurality of interactions with the hosted application in parallel with one another and provide quick analysis of the results.

Figure 3:
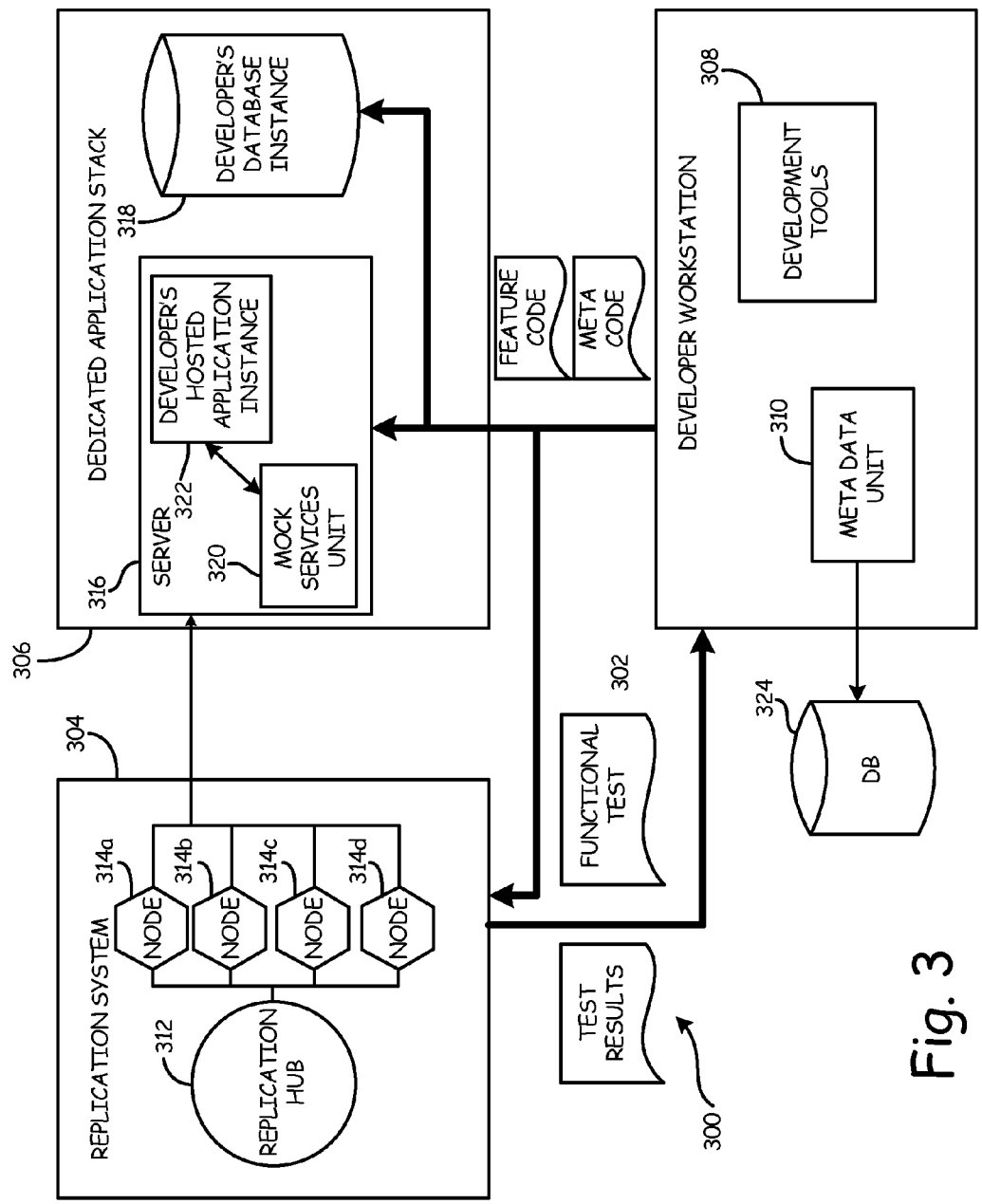
FIG. 3 is a block diagram of a framework for testing an additional feature to be deployed as part of a hosted application according to an embodiment of the present invention.

FIG. 3 is a block diagram illustrating an example framework 300 for testing an additional feature to be deployed as part of a hosted application. Framework 300 includes developer machine 302, replication system 304, and dedicated application stack 306. In the embodiment shown in FIG. 3, replication system 304 and dedicated application stack 306 are illustrated as separate components, but collectively could both be considered a part of testing site 156 described with respect to FIG. 2.

Developer machine 302 hosts development tools used by the developer to build coded features to be included as part of the hosted application, as well as to build functional tests employed to test the coded features. In addition, developer workstation 302 hosts meta data unit 310, which as described in more detail below, is utilized to create the developer's instance of the hosted application. Replication system 304 includes replication hub 312 as well as nodes 314a-314d. Replication system 304 receives functional tests designed by the developer and distributes the functional tests to a plurality of nodes 314a-314d for implementing, in parallel, functional testing of the hosted application. Dedicated application stack 306 includes components required to host the developer's instance of the hosted application. In particular, dedicated application stack 306 includes server 316 and developer's database instance 318. In the embodiment shown in FIG. 3, server 316 includes mock services unit 322 and developer's hosted application instance. Dedicated application stack 304 is responsible is responsible for hosting coded feature to be tested, along with any other portions of the hosted application (e.g., e-commerce site) required for operation—collectively referred to herein as the hosted application 314.

Although illustrated as a laptop device, developer machine 302 may be implemented with various other hardware devices. For example, in one embodiment, developer machine 302 is a continuous integration server that resides locally at the developer's location. Developer machine 302 may also be utilized to perform unit testing on the feature to be deployed.

From developer machine 302, a developer is able to deploy the developer's instance of the hosted application to dedicated application stack 306. In the embodiment shown in FIG. 3, developer workstation 302 utilizes meta data unit 310 to collect a minimum set of data required to create the developer's instance of the hosted application. For example, the hosted application—when fully deployed—may require access to a large database of information as well as all features of the hosted application; making duplication of the hosted application in its entirety for each developer cost prohibitive. In one embodiment, developer workstation 302 utilizes meta-data unit 310 (i.e., ExtractData application) to gather database content (e.g., push jars and snapshots) from main database 324 for deployment to developer's database instance 318. In particular, metadata unit 310 may be configured to analyze database 324 and pull or retrieve minimum sets of data for an application that is to include additional features. For example, if the additional feature is related to a tax calculation, metadata unit 310 may retrieve known tax rates from database 324. Further, metadata unit 310 may analyze whether additional data is needed or not to run an application. In some instances, a test and/or an additional coded feature may provide information that is used by metadata unit 310 to determine whether particular information is necessary. By only pulling a minimum set of data, metadata unit 310 reduces the number of possible failures that facilitates root cause analysis. Selected database content from local database 324 may be packaged into archive files provided to developer's database instance 318 for use in the functional test environment, and may be utilized over and over again by the developer whenever conducting another test of a feature. In this way, a developer may utilize the same database snapshot over and over, thereby ensuring that any changes in the outcome of the tests are a result of the coded feature being tested, and not due to changes within the database. In this way, each developer is able to create an isolated, share nothing database instance that is one factor in providing a deterministic functional framework.

Developer workstation 302 also allows the developer to create the feature to be deployed as part of the hosted application. In one embodiment, development tool 308—e.g., java programming language—allows the developer to use the same programming language to develop both the coded feature to be tested as well as the tests to be run against the hosted application instance. The feature code is deployed by developer workstation 302 to dedicated application stack 306. Likewise, development tool 308 can also be used by the developer to create the functional test to be run against the coded feature. As discussed above, the same programming language used by the developer to develop the coded feature may also be used by the developer to develop the functional tests. By utilizing the same programming language for both applications, the tests remain accessible for the developers to create along with the feature code.

In this way, developer workstation 302 allows a developer to create—via meta data unit 310—a developer's instance of the hosted application for deployment to dedicated application stack 306, and to create—via development tools 308—the coded feature and functional tests to be run against the coded feature.

In the embodiment shown in FIG. 3, dedicated application stack 306 hosts server 316—which in turn hosts mock serves unit 320 and developer's hosted application instance 322—and developer's database instance 318. To ensure that the test environment is deterministic, dedicated application stack 304 is a "share-nothing" system in which the dedicated application stack 304 is isolated from other instances of the hosted application. That is, each developer has his "own" dedicated application stack for use in testing. This is in contrast with typical test environments, in which each developer is utilizing and sharing the same test environment. While a benefit of prior art systems is that a single application stack can be shared by a plurality of users, the system is no longer deterministic because tests or changes made by one developer may—inadvertently—affect the results of a test run on the same system by another developer. To allow each developer access to a dedicated application stack, an embodiment of the present invention allows developers to "spin up" a generic server for the duration of the test, and when done allows the generic server to be used by another. For example, in one embodiment, server access and time may be acquired from a $3^{rd}$ party supplier like Amazon Web Services (AWS).

In addition to hosting the developer's application instance and the developer's database instance, dedicated application stack 306 also receive—as a part of the meta data provided by developer workstation 302—rules or guidelines for implementing mock services unit 320. In particular, mock services unit 320 emulates those actions typically performed by third party service providers. For example, in an e-commerce application, payment verification may be done by a $3^{rd}$ party, which is outside of the control of the developer. As a result, a fault in the $3^{rd}$ party application may result in an unspecified error being generated during functional testing. To avoid this type of fault and to ensure that the test environment remains deterministic, mock services unit 320 stands in for many of the functions required by the hosted application. Mock services may be implemented with a single web application incorporated into a file (e.g., x-stream.properties file) uploaded to server 316 as part of the meta data provided by developer workstation 302. In one embodiment, the mock service web application contains a library of scenario rule sets, such as "Payment verification successful" and "Payment verification failed". Once installed on server 316, any tests on the hosted application that require the hosted application to access a third party service are instead handled by the mock services unit 320 being run by server 316. Mock services are able to simulate a variety of communication protocols, including HTTP web services, such as SOAP, REST, XML-RPC, and PDX communication, as well as other types of services such as UDP (e.g., NetAcuity). In this way, test framework 300 does not rely on external services provided by third parties and therefore remains deterministic.

In addition to uploading the above-identified features, archives, and mock services to dedicated application stack 306 in order to deterministically simulate the hosted application, the developer also provides functional tests to be automatically run by replication system 304 against dedicated application stack 306. In the embodiment shown in FIG. 3, replication system 304 includes replication hub 312 and replication nodes 314a-314d. In one embodiment, replication hub is implemented with Selenium server hub, and nodes 314a-314d are implemented with a plurality of Selenium nodes. Replication hub 312 receives the uploaded test from developer workstation 302 and selectively assigns tests to the plurality of nodes 314a-314d. In the embodiment in which Selenium nodes are utilized, each test node 314a-314d can emulate a plurality of entities (e.g., shoppers) accessing various aspects of the hosted application. For example, in the embodiment in which the hosted application is an e-commerce website, each test hub 314a-314d is able to emulate a number of real "shoppers" attempting to access the e-commerce website. Test nodes 314a-314d may operate in parallel, resulting in a number of tests to be run against the hosted application simultaneously. In this way, the tests are conducted automatically, without requiring a tester to manually interact with the hosted application. Test results are provided in a timely manner, and because the test results are deterministic, the test results do not require a large amount of time and effort to interpret.

By leveraging a plurality of networked servers or nodes 314a-314d, functional tests may run much more quickly. Further, offsite networked nodes 314a-314d may be much more cost effective for a development organization. That is, a development site may not need to have a plurality of servers onsite. In some cases, replication system 304 may include more than five-hundred networked nodes. After performing the tests, replication system 304 may provide a report to developer work station 302. In some examples the test report may be based on a test including any combination of the following properties:

Test SHOULD represent a use case; it is a coded reference representation of requirements.
Test MUST have no dependencies on other tests
Test CAN belong to multiple test suites
Test MUST distinguish between environment error and a true error
Test MUST be optimized for time
Test MUST output one of three statuses
RED (Failed), ORANGE (Environment Error), GREEN (Success)
Test MUST perform proper cleanup of acquired resources (File Handles, Socket Handles, etc. . . . )

In the embodiment described with respect to FIG. 3, developer workstation 302, replication system 304, and dedicated application stack 306 are described as separate physical components. In other embodiments, while logical operations performed by each remain separate, instances may be initiated on shared hardware systems. A benefit of the embodiment shown in FIG. 3, is that the developer or organization the developer is associated with does not need to maintain dedicated hardware for each developer to host instances of the hosted application instance and replication system. Rather, the embodiment shown in FIG. 3 allows a developer to "spin up" external resources for the purpose of, for example, hosting a developer's instance of the hosted application or simulating users accessing the hosted application as done by the replication system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of testing a feature to be deployed as part of a hosted application comprising:
   building an individual, replicated instance of the hosted application using a minimum set of information required for the instance of the hosted application, wherein the instance comprises a dedicated stack hosting a server with a mock services unit emulating systems representing external dependencies, and a developer's database instance comprising minimal database content selected by a meta data unit;
   deploying a coded feature to the replicated instance of the hosted application; and
   running a test on the deployed coded feature.

2. The method of claim 1, wherein building an instance of the hosted application includes utilizing a meta data unit to analyze database content and selecting a minimum set of database content to package into archive files provided to the instance of the hosted application.

3. The method of claim 1, wherein the archive files are used repetitively by a developer each time an instance of the hosted application is built to test a new coded feature.

4. The method of claim 1, wherein the hosted application is an ecommerce application and the minimum set of information retrieved from the database includes template and site files.

5. The method of claim 1, wherein running a test on the deployed coded feature includes writing a functional test and deploying the functional test to a replication system.

6. The method of claim 5, wherein the replication system includes a plurality of nodes that based on the received functional test simulate users interacting with the hosted application.

7. The method of claim 6, wherein the replication system interacts with the hosted application in an automated fashion.

8. The method of claim 6, wherein the plurality of nodes are Selenium nodes.

9. The method of claim 6, wherein the plurality of nodes communicate with the instance of a hosted application use HTTP/S protocol.

10. A system configured to test a feature to be deployed as part of a hosted application, the system comprising:
    a workstation coupled to the communications network;
    a dedicated application stack coupled to the workstation via a communication network, wherein the dedicated application stack is configured to host an instance of a hosted application and a coded feature deployed to the dedicated application stack form the workstation, wherein the workstation provides meta data to the dedicated application stack that describes or represents a minimum set of information required for the instance of the hosted application; and
    a replication system coupled to the workstation via a communication network, wherein the workstation provides functional tests for the replication system to perform on the deployed coded feature.

11. The method of claim 10, wherein the workstation is configured to enable a developer to write the coded feature and the functional test.

12. The method of claim 11, wherein the archive files represent a snapshot of the database that can be re-used each time a new instance of the hosted application is created to test.

13. The method of claim 10, wherein the workstation includes a meta data unit that analyzes database content and selects a minimum set of database content to package into archive files provided to the dedicated application stack to create the instance of the hosted application.

14. The method of claim 11, wherein the hosted application is an ecommerce application and the minimum set of information retrieved from the database includes template and site files.

15. The method of claim 11, wherein the workstation further provides to the dedicated application stack a mock services application that emulates services provided by third party service providers such that the instance of the hosted application is free from external dependencies.

16. The method of claim 11, wherein the replication system includes a plurality of nodes that interact with the instance of the hosted application to simulate users interacting with the hosted application and the coded feature being tested.

17. The method of claim 16, wherein plurality of nodes are Selenium nodes.

18. The method of claim 11, wherein the replication system interacts with the instance of the hosted application in an automated fashion based on functional tests provided by the workstation.

* * * * *